United States Patent [19]

Ohmura

[11] Patent Number: 5,702,757
[45] Date of Patent: Dec. 30, 1997

[54] PROCESS FOR PRODUCING MAGNETIC RECORDING MEDIUM

[75] Inventor: Taro Ohmura, Miyagi, Japan

[73] Assignee: Sony Corporation, Tokyo, Japan

[21] Appl. No.: 722,639

[22] Filed: Sep. 27, 1996

[30] Foreign Application Priority Data

Sep. 29, 1995 [JP] Japan ................ 7-254258

[51] Int. Cl.$^6$ ............... B05D 5/12; G11B 5/845; C08K 3/22
[52] U.S. Cl. ............... 427/131; 427/130; 427/128; 428/694 B; 428/694 BA; 428/694 BB; 428/695; 428/900; 428/928; 252/62.51; 524/431
[58] Field of Search ............... 427/128, 131; 428/900, 928, 694 B; 252/62.51

[56] References Cited

U.S. PATENT DOCUMENTS

| | | | |
|---|---|---|---|
| 5,084,343 | 1/1992 | Ogawa | 428/900 |
| 5,132,179 | 7/1992 | Hashimoto et al. | 427/128 |
| 5,162,146 | 11/1992 | Ren et al. | 427/128 |
| 5,275,879 | 1/1994 | Yoshida et al. | 428/900 |
| 5,424,094 | 6/1995 | Tsunoda et al. | 428/900 |
| 5,449,527 | 9/1995 | Tobisawa et al. | 427/128 |
| 5,478,626 | 12/1995 | Mori et al. | 427/128 |

*Primary Examiner*—Tae Yoon
*Attorney, Agent, or Firm*—Hill, Steadman & Simpson

[57] ABSTRACT

A process for preparing a magnetic recording medium capable of exhibiting excellent magnetostatic properties, electromagnetic conversion properties and travel durability in a high density recording region, is disclosed, which process includes the steps of mixing a magnetic powder having a major axis length of 0.1 μm or less, a first binder composed primarily of a vinyl chloride-based copolymer composed of a sulfonate group and/or a group derived from quaternary ammonium salt, a hydroxyl group and an epoxy group and having an average degree of polymerization of 100 to 200, and a first solvent with each other to form a mixture, and dispersing and diluting the mixture by adding a non-magnetic hard inorganic powder, a second binder and a second solvent to the mixture to prepare a magnetic coating material.

7 Claims, No Drawings

PROCESS FOR PRODUCING MAGNETIC RECORDING MEDIUM

BACKGROUND OF THE INVENTION

1. Field of the Invention

This invention relates to a process for producing a so-called coating-type magnetic recording medium, and more particularly to a process for the preparation of a magnetic recording medium suitable for high density recording.

2. Prior Art

Magnetic recording media have been extensively utilized in various fields such as audio apparatuses, video apparatuses or computers. Recently, there is an increasing demand for such magnetic recording media.

In general, it is known that a so-called coating-type magnetic recording media is prepared by coating or transferring a magnetic coating material composed of a magnetic powder, a binder and a solvent, on a non-magnetic substrate such as a polyester film so that a magnetic layer is formed thereon. The magnetic coating material used for forming the magnetic layer can be generally prepared by in turn dispersing the magnetic powder and various additives in the binder (mixing and kneading step) in which the mixture is exposed to a shearing force generated at portions between agitator blades or the agitator blade and a vessel, and adding dispersion media such as ceramic beads, a binder and a solvent to the mixture and causing the dispersion media to rotate at a high velocity so that an impact force is generated due to collision between the dispersion media to uniformly disperse the magnetic powder in the binder (diluting and dispersing step).

In the magnetic recording media of such a coating type, not only properties of the magnetic powder itself but also dispersibility of the magnetic powder in the magnetic layer and a strength of the magnetic layer are extremely important factors. Therefore, many studies have been made on the dispersibility of the magnetic powder and the strength of the magnetic layer from a variety of viewpoints.

For example, binders conventionally used are organic polymer compounds such as polyester-based resins, cellulose-based resins, polyurethane-based resins, vinyl chloride-based resins, a vinyl chloride/vinyl acetate copolymer, a vinyl chloride/vinyl acetate/vinyl alcohol copolymer, a vinyl chloride/vinylidene chloride copolymer, an acrylonitrile/butadiene copolymer, phenol-based resins, epoxy-based resins, polyamide-based resins, polyvinyl butyral, nitrocellulose, cellulose acetate-butyrate, acrylic resins, electron beam-curing resins, or the like.

These binders individually has both advantages and disadvantages and therefore are used in the form of a mixture of any two or more thereof rather than in the form of a single material. For example, a relatively hard resin such as vinyl chloride-based resins, polyvinyl butyral, nitrocellulose or the like is suitably used in combination with a relatively soft resin such as polyester-based resins, polyurethane-based resins, an acrylonitrile-butadiene copolymer or the like to enhance mechanical properties of the magnetic layer. Further, it is known to add a hardening agent to the binder. In such a case, by introducing a hydroxyl group into the binder, the hydroxyl group is reacted with a polyisocyanate compound added as the hardening agent to impart a mechanical strength to the magnetic layer. The use of the hardening agent is a measure frequently adopted in the field of magnetic tapes used for video recording.

In the meantime, recently, there is also a strong demand for enhancing a recording density of the magnetic recording medium or improving a S/N ratio thereof. In order to satisfy the demand, the magnetic powder is caused to be finely pulverized or required to have a high magnetic force and a high coercive force.

The fine pulverization of the magnetic powder is associated with an extreme difficulty in dispersing the magnetic powder in the coating material. If the magnetic powder is not uniformly dispersed in the coating material, filling of the magnetic powder in the coating material and a surface smoothness of the magnetic layer formed therefrom are deteriorated, resulting in deterioration in an electromagnetic conversion property of the finally produced magnetic recording medium. Accordingly, when it is intended to finely pulverize the magnetic powder, it is simultaneously required that the dispersibility of the magnetic powder in the coating material is improved properly.

Under these circumstances, as measures for enhancing the dispersibility of the magnetic powder in the coating material, there have been proposed a method in which a high-molecular weight resin having an average degree of polymerization of 300 or more, which corresponds to an weight-average molecular weight of 20,000 or more in terms of styrene when measured by a gel permeation chromatography (GPC), is used as a binder, a method in which a low-molecular weight surface-active agent is used as a dispersant, or the like.

However, although the method employing the high-molecular weight resin as a binder is effective for improving dispersibility of the magnetic powder having a major axis length of greater than 0.1 µm, dispersibility of a magnetic powder having a major axis length of 0.1 µm or less is rather adversely affected by the method. This is because, in the case where the magnetic powder having such a small major axis length is intended to be dispersed in a high-molecular weight binder, the amount of the binder absorbed on the magnetic powder is decreased so that a sufficient wettability of the magnetic powder cannot be obtained.

On the other hand, in the case where the surface active agent is added as a dispersant to the binder, if the amount of the surface active agent added becomes too large, a durability of the magnetic layer is deteriorated. In addition, there is a likelihood that the use of the surface active agent causes unsuitable contamination of a magnetic head. For this reason, the amount of the surface active agent added is necessarily limited, so that the dispersibility of the magnetic powder in the magnetic layer cannot be improved to a sufficient extent.

Furthermore, there has been proposed a method in which a vinyl chloride-based resin into which hydrophilic group, e.g., sulfur or phosphorus-containing salt-type strong acids such as $SO_3M$, $SO_4M$, $PO_4M_2$ or $PO_3M_2$ where M represents an alkali metal or an ammonium group is introduced, is used as the binder. When the vinyl chloride-based resin into which the hydrophilic group is introduced is used as a binder, dispersibility and dispersion stability of the magnetic powder can be improved and a high strength of the magnetic layer can be obtained due to a strong intermolecular force of the binder. Based on these advantages, there is a recent tendency to extensively utilize the hydrophilic group-containing binder for the magnetic recording medium.

However, even though such a binder is used, the magnetic powder having a major axis length of 1 µm or less cannot have a sufficient dispersibility. For this reason, it is still extremely difficult to enhance an electromagnetic conversion property of the magnetic recording medium in a high density recording region.

In order to enhance the dispersibility of the magnetic powder, it is suggested that, in addition to selection of suitable binders, a high solid content of the mixture or an increased shearing force is used in the mixing and kneading step of the magnetic coating material. However, if the solid content is raised, a mechanical load required to mix the coating material is increased. This results in limiting the solid content of the mixture. Accordingly, it is difficult to improve the dispersibility of the magnetic powder only by the high solid content and the increased shearing force.

SUMMARY OF THE INVENTION

The present invention has been accomplished to overcome the afore-mentioned problems encountered in the prior art.

It is therefore an object of the present invention to provide a process for producing a magnetic recording medium, in which, even when a magnetic powder having a major axis length of 0.1 µm or less is used, the magnetic powder can be uniformly dispersed in a magnetic layer of the magnetic recording medium so that the magnetic recording medium exhibiting a good electromagnetic conversion property even in a high density recording region can be produced.

In a first aspect of the present invention, there is provided a process for producing a magnetic recording medium, which process includes the steps of mixing and kneading a magnetic powder having a major axis length of 0.1 µm or less, a first binder composed primarily of a vinyl chloride-based copolymer containing a sulfonate group and/or a group derived from quaternary ammonium salt, a hydroxyl group and an epoxy group and having an average degree of polymerization of 100 to 200, and a first solvent with each other to form a mixture; and dispersing and diluting the mixture by adding a non-magnetic hard inorganic powder, a second binder and a second solvent thereto to prepare a magnetic coating material.

In a second aspect of the present invention, there is provided the process for producing a magnetic recording medium according to the above first aspect, wherein the mixture has a solid content of 75 to 90% by weight when calculated according to the equation of: Solid content (wt %)={(total weight of the mixture)−(weight of first solvent)}/(total weight of the mixture)×100.

In a third aspect of the present invention, there is provided the process for producing a magnetic recording medium according to the above first aspect, wherein the weight ratio of the magnetic powder to the first binder (weight of the magnetic powder/weight of the first binder) is in the range of 6 to 15.

These and other objects, advantages and features of the present invention will becomes more apparent from the following description when read in conjunction with the appended claims.

DETAILED DESCRIPTION OF THE INVENTION

In accordance with the present invention, the coating-type magnetic recording medium can be produced by coating a magnetic coating material composed of a magnetic powder, a binder, a variety of additives such as a plasticizer, a lubricant, an anti-static agent or an abrasive, and a solvent, on a non-magnetic substrate to thereby form a magnetic layer thereon.

The magnetic coating material used for the production of the magnetic layer is prepared by dispersing the magnetic powder in the first binder and the first solvent by the aid of a shearing force generated at portions between agitator blades or the agitator blade and a vessel (mixing and kneading step), adding dispersion media such as ceramic beads together with the second binder and the second solvent to the mixture so as to cause the dispersion media to rotate at a high velocity whereby the magnetic powder is uniformly dispersed in the binder due to an impact force generated by the collision between the dispersion media (diluting and dispersing step).

With the thus-prepared magnetic recording medium, in order to achieve a high-density recording thereon, it is required that the magnetic powder having a major axis length of, for example, 0.1 µm or less is used to prepare the magnetic coating material.

In accordance with the present invention, preparation conditions, especially for the mixing and kneading step, are properly controlled to highly disperse such a fine magnetic powder in the magnetic layer.

In accordance with a first preferred form of the present invention (first invention), in the mixing and kneading step, the magnetic powder having a major axis length of 0.1 µm or less is mixed with the first binder composed, primarily of the vinyl chloride-based copolymer containing a sulfonate group and/or a group derived from quaternary ammonium salt, a hydroxyl group and an epoxy group and having an average degree of polymerization of 100 to 200 and the first solvent.

The sulfonate group and/or the group derived from quaternary ammonium salt which are introduced into the vinyl chloride-based copolymer serves to improve a dispersibility of the magnetic powder in the binder. The content of the sulfonate group and/or the group derived from quaternary ammonium salt is preferably in the range of 0.3 to 3.0% by weight. When the content of the sulfonate group and/or the group derived from quaternary ammonium salt is less than 0.3% by weight, the dispersibility of the magnetic powder in the binder becomes low, whereby the electromagnetic conversion property of the resultant magnetic recording medium is deteriorated. On the other hand, when the content of the sulfonate group and/or the group derived from quaternary ammonium salt is more than 3.0% by weight, the dissolvability of the vinyl chloride-based copolymer in the solvent is deteriorated. Incidentally, when the group derived from quaternary ammonium salt is introduced into the vinyl chloride-based copolymer, it can also function as a catalyst for the reaction between the hydroxyl group of the vinyl chloride-based copolymer and isocyanate added thereto as a hardening agent. The function as the catalyst can be sufficiently exhibited when the content of the group derived from quaternary ammonium salt is not less than 0.3% by weight.

The hydroxyl group introduced into the vinyl chloride-based copolymer is reacted with isocyanate added to the binder as the hardening agent to form a cross-linked structure. The content of the hydroxyl group introduced into the vinyl chloride-based copolymer is preferably in the range of 0.1 to 1.5% by weight. When the content of the hydroxyl group introduced into the vinyl chloride-based copolymer is less than 0.1% by weight, the cross-linking ability of the binder is deteriorated so that the magnetic layer cannot have a sufficient mechanical strength. On the other hand, when the content of the hydroxyl group is more than 1.5% by weight, the viscosity of the magnetic coating material becomes high so that a coating property thereof is deteriorated.

The epoxy group introduced into the vinyl chloride-based copolymer serves to prohibit dehydrochlorination of the vinyl chloride-based copolymer whereby the magnetic coating film (magnetic layer) is prevented from rust formation due to a hydrochloric acid liberated from the vinyl chloride-based copolymer. The content of the epoxy group introduced into the vinyl chloride-based copolymer is preferably in the range of 1.0 to 10.0% by weight. When the content of the epoxy group is less than 1.0% by weight, the dehydrochlorination of the vinyl chloride-based copolymer cannot be prohibited to a sufficient extent, whereby undesired rust formation is likely to occur at the magnetic layer. On the other hand, when the content of the epoxy group is more than 10.0% by weight, the viscosity of the magnetic coating material becomes high so that the coating property thereof is deteriorated.

The average degree of polymerization of the vinyl chloride-based copolymer is limited to a relatively low value ranging from 100 to 200. In order to uniformly disperse the magnetic powder having a major axis length of 0.1 μm or less in the binder, it is important that the vinyl chloride-based copolymer has such a small average degree of polymerization. When the average degree of polymerization of the copolymer exceeds 200, the wettability of the magnetic powder by the binder is deteriorated, so that the magnetic powder cannot be uniformly dispersed to a sufficient extent in the binder. Further, in such a case, the viscosity of the magnetic coating material becomes high so that the coating property thereof is also deteriorated. On the other hand, when the average degree of polymerization is less than 100, the magnetic layer cannot has a sufficient mechanical strength even though the hardening agent is used therein, so that the durability of the magnetic layer is insufficient.

As described above, in the process for the production of the magnetic recording medium according to the present invention, the magnetic powder having a major axis length of 0.1 μm or less is mixed and kneaded together with the vinyl chloride-based copolymer, a variety of additives, and the solvent. However, in order to uniformly disperse the magnetic powder in the binder, it is required to withhold the addition of hard inorganic particles such as carbon black as an anti-static agent and an abrasive to the mixture in the mixing and kneading step. Thus, when the magnetic powder is present as a sole powder component in the mixing and kneading step, a high shearing force can be generated in a kneader, so that it is possible to highly and uniformly disperse the magnetic powder in the magnetic coating material.

In the mixing and kneading step in which a specific binder is used and the magnetic powder is a sole powder component, any magnetic powder generally used for the coating type magnetic recording media can be used.

For example, the magnetic powder having a major axis length of 0.1 μm or less may be composed of ferromagnetic metal powder, ferromagnetic iron oxide particles, fine particles of ferromagnetic $CrO_2$, ferromagnetic cobalt-ferrite ($CoO$—$Fe_2O_3$), a cobalt-absorbed oxide, hexagonal-system barium ferrite or iron nitride, or the like.

The ferromagnetic iron oxide fine particles are composed of a material represented by $FeO_x$ where x is more than 1.33 but less than 1.51. Examples of the material for the ferromagnetic iron oxide particles may include magnetite ($\gamma$-$Fe_2O_3$ which corresponds to $FeO_x$ where x is 1.5), magnetite ($Fe_3O_4$ which corresponds to $FeO_x$ where x is 4/3) or solid solutions thereof. In order to enhance a coercive force, cobalt is added to the ferromagnetic iron oxide fine particles.

In the case where the ferromagnetic chromium dioxide ($CrO_2$) is used, at least one element selected from Ru, Sn, Te, Sb, Fe, Ti, V, Mn and the like may be added thereto in order to enhance a coercive force thereof.

The ferromagnetic metal powder can be a Fe metal powder, a Fe-alloy powder, a Cobalt-alloy powder or a Nickel-alloy powder. Specific examples of these ferromagnetic metal powders may include Fe—Co, Fe—Ni, Fe—Co—Ni, Co—Ni, Fe—Co—B, Fe—Co—Cr—B, Mn—Bi, Mn—Al, Fe—Co—V, or compounds composed of at least one of these alloys and other element(s).

The kneaders or blenders usable in the mixing and kneading step, are a continuous double-screw kneader which may have a function of multi-stage dilution, a co-kneader, a pressure kneader or any other conventional types of kneaders.

The magnetic coating material can be prepared by diluting and dispersing the mixture thus prepared in the mixing and kneading step. In accordance with the present invention, the non-magnetic hard inorganic powder not added in the preceding mixing and kneading step can be added to the mixture in this diluting anti dispersing step.

Specifically, in the diluting and dispersing step, the mixture prepared in the preceding mixing and kneading step is mixed with the non-magnetic hard inorganic powder, the additional binder and the solvent.

Examples of the non-magnetic hard inorganic powder may include carbon black as an anti-static agent, alumina as an abrasive, chromium oxide, or the like.

Further, examples of the additional binder, i.e., the second binder, may include organic polymer compounds such as polyester-based resins, cellulose-based resins, polyurethane-based resins, vinyl chloride-based resins, a vinyl chloride-vinyl acetate copolymer, a vinyl chloride-vinyl acetate-vinyl alcohol copolymer, a vinyl chloride-vinylidene chloride copolymer, an acrylonitrile-butadiene copolymer, phenol-based resins, epoxy-based resins, polyamide-based resins, polyvinyl butyral, nitrocellulose, cellulose acetate butyrate, acrylic resins, electron beam-curing resins or the like.

Dispersing apparatuses usable in the diluting and dispersing step are a vertical sand mill, a lateral sand mill, a spike mill, a ball mill, a tower mill, a pearl mill, DCP, or the like. The dispersing media added in the diluting and dispersing step can be steel balls, ceramic beads, or the like.

In addition to the non-magnetic hard inorganic powder, various liquid additives such as a plasticizer or a lubricant can be added to the magnetic coating material. These liquid additives can be added to the magnetic coating material at any stage of the mixing and kneading step and the diluting and dispersing step or subsequent steps to the diluting and dispersing step.

Illustrative of the plasticizers are dibutyl phthalate, triphenyl phosphate, or the like.

Examples of the lubricants are hydrocarbon-based lubricants such as dioctyl-sulfo-sodium succinate, t-butyl phenol-polyethylene ether, ethyl naphthalene-sodium sulfonate, dilauryl succinate, metal salts of stearic acid or stearic acid esters, silicone-based lubricants such as a silicone oil, fluorine-containing lubricants such as perfluoropolyethers or perfluorocarboxylates, or the like.

If a softening point of the vinyl chloride-based copolymer used in the mixing and kneading step is too low, there eventually arise problems that the vinyl chloride-based copolymer is undesirably softened by a frictional heat generated when it is brought into contact with various slide members or a magnetic head, or that magnetic tapes produced undergoes blocking when wound into a roll. In such a case, other resins can be blended in the binder unless the addition of the resins adversely affects the dispersibility of the magnetic powder, or the vinyl chloride-based copolymer can be blended with a compound being cross-linkable therewith. The amount of these resins or compounds blended is suitably in the range of 0.05 to 0.5 parts by weight based on 100 parts by weight of the vinyl chloride-based copolymer.

Illustrative of the compounds cross-linkable with the vinyl chloride-based copolymer are epoxy resins, isocyanate-based resins, melamine resins, polyol resins or the like. In the case where the epoxy group introduced into the vinyl chloride-based copolymer is subjected to a cross-linking reaction, compounds such as triazine thiol, dibutyltin dilaurate or the like can be used as a cross-linking agent. In the meantime, when the epoxy group of the vinyl chloride-based copolymer is utilized to form the cross-linked structure, the compounds cross-linkable with vinyl chloride-based copolymer is preferably added to the binder after the diluting and dispersing step. The compounds other than the aforementioned cross-linkable compounds can be added to the binder at either during the mixing and kneading step or before the diluting and dispersing step.

If the glass-transition point of the binder is out of an appropriate temperature range, the temperature can be adjusted by adding any other resins thereto. The resins which can be blended so as to adjust the glass-transition point of the binder, are those having a good compatibility with the binder. Examples of the resins include polyurethane resins, polyester resins, cellulose-based resins, acrylic resins, acetal resins or the like. These resins can be blended to the binder at either during the mixing and kneading step or before the diluting and dispersing step.

Next, according to the second preferred from of the present invention (second invention), in the mixing and kneading step, the magnetic powder having a major axis length of 0.1 μm or less can be mixed and kneaded with the first binder composed primarily of the vinyl chloride-based copolymer containing a sulfonate group and/or a group derived from quaternary ammonium salt, a hydroxyl group and an epoxy group and having an average degree of polymerization of 100 to 200, and the first solvent. In particular, according to the second preferred form of the present invention, the solid content of the mixture subjected to the mixing and kneading step is adjusted to a range of 75 to 90% by weight, preferably 80 to 90% by weight.

Meanwhile, the solid content of the mixture subjected to the mixing and kneading step is a value (% by weight) obtained from the equation: {(total weight of the mixture) −(weight of first solvent)}/(total weight of the mixture)×100. Thus, by adjusting the solid content of the mixture subjected to the mixing and kneading step to 75% by weight or higher, a large shearing force is obtained in the kneader used therefor so that the dispersibility of the magnetic powder in the binder can be enhanced. However, if the solid content of the mixture subjected to the mixing and kneading step is more than 90% by weight, a load applied to the kneader becomes too large, so that damage to the kneader is likely to occur.

The weight ratio of the magnetic powder to the binder (weight of the magnetic powder/weight of the binder) is in the range of 6 to 15, preferably 7 to 15. If the weight ratio of the magnetic powder to the binder is maintained in such a range, it becomes possible to uniformly disperse the magnetic powder in the binder. Specifically, by adjusting the weight ratio of the magnetic powder to the binder to 6 or more, a large shearing force can be generated in the kneader so that the dispersibility of the magnetic powder in the binder can be enhanced. However, if the weight ratio of the magnetic powder to the binder exceeds 15, a load applied to the kneader becomes too large, whereby damage to the kneader is likely to occur.

The content of the functional groups introduced into the binder and the kind of the magnetic powder can be the same as described above with respect to the first preferred form of the present invention. Further, conditions of the diluting and dispersing step conducted after the mixing and kneading step may be set to those adopted conventionally.

Meanwhile, various additives in the form of hard inorganic powder or liquid can be added to the magnetic coating material. These additives can be blended to the binder at any stage of the process for the preparation of the magnetic coating material. However, if the solid content of the mixture subjected to the mixing and kneading step is adjusted to a value ranging from 75 to 90% by weight and the hard inorganic powder is blended not in the mixing and kneading step but in the diluting and dispersing step, the dispersibility of the magnetic powder in the binder is further enhanced.

The coating-type magnetic recording medium can be produced by coating the magnetic coating material thus prepared through the mixing and kneading step and the diluting and dispersing step, on the non-magnetic substrate.

As the non-magnetic substrate, there can be used, for example, polyesters such as polyethylene terephthalate, polyolefins such as polyethylene or polypropylene, cellulose derivatives such as cellulose triacetate, cellulose diacetate or cellulose acetate butyrate, vinyl-based resins such as polyvinyl chloride or polyvinylidne chloride, plastics such as polycarbonates, polyimides, polyamides or polyamide-imides, papers, light metals such as metals, e.g., aluminum or copper, or alloys, e.g., aluminum alloys or titanium alloys, ceramics, single crystal silicon, or the like.

The non-magnetic substrate can have any shape or configuration, for example, film, tape, sheet, disc card, drum or the like.

Although essential features of the process for the production of the magnetic recording medium according the present invention are described above, the process can be further include the step of forming a back coat layer, which is composed of a binder and an anti-static agent such as carbon black dispersed in the binder, on a back surface of the non-magnetic substrate opposite to a side where the magnetic layer is formed, or forming a top coat layer containing a rust-preventive or a lubricant on the magnetic layer. The back coat layer and the top coat layer can be formed by normally used methods.

EXAMPLES

The present invention is described in more detail below by way of various experimental examples.

Experimental Examples 1 to 17

Studies on Binders Used in the Mixing and Kneading Step

A magnetic tape was prepared in the following manner.

First, raw materials for the magnetic coating material, having the below-mentioned composition, were charged into an extruder manufactured by Kurimoto Tekkosho Co., Ltd. and intimately mixed and kneaded together. The vinyl chloride copolymers used in the respective experimental examples had degrees of polymerization, and functional groups and contents of the functional groups shown in Tables 1 and 2. Further, the solvent was blended so as to adjust a solid content of the mixture to 85% by weight.

Composition of Mixture Treated in Mixing and Kneading Step

Magnetic iron powder (specific surface area: 55 $m^2/g$, major axis length: 0.08 μm) 100 parts by weight Binder: vinyl chloride copolymer 10 parts by weight Solvent: a mixed solvent composed of methyl ethyl ketone, cyclohexanone and toluene at weight ratio of 1:1:1.

TABLE 1

| | Degree of polymerization | Vinyl chloride (wt %) | Sulfonate group (wt %) | Hydroxyl group (wt %) | Epoxy group (wt %) |
|---|---|---|---|---|---|
| Experimental Example 1 | 150 | 85.5 | 1.5 | 0.4 | 2.0 |
| Experimental Example 2 | 100 | 85.0 | 1.5 | 0.4 | 2.0 |
| Experimental Example 3 | 200 | 85.0 | 1.5 | 0.4 | 2.0 |
| Experimental Example 4 | 50 | 85.0 | 1.5 | 0.4 | 2.0 |
| Experimental Example 5 | 250 | 85.0 | 1.5 | 0.4 | 2.0 |
| Experimental Example 6 | 150 | 85.0 | 0.0 | 0.4 | 2.0 |
| Experimental Example 7 | 150 | 85.0 | 1.5 | 0.0 | 2.0 |
| Experimental Example 8 | 150 | 85.0 | 1.5 | 0.4 | 0.0 |

TABLE 2

| | Degree of polymerization | Vinyl chloride (wt %) | Quaternary ammonium salt group (wt %) | Sulfonate group (wt %) |
|---|---|---|---|---|
| Experimental Example 9 | 150 | 85.5 | 1.5 | 0.0 |
| Experimental Example 10 | 100 | 85.0 | 1.5 | 0.0 |
| Experimental Example 11 | 200 | 85.0 | 1.5 | 0.0 |
| Experimental Example 12 | 50 | 85.0 | 1.5 | 0.0 |
| Experimental Example 13 | 250 | 85.0 | 1.5 | 0.0 |
| Experimental Example 14 | 150 | 85.0 | 1.5 | 0.0 |
| Experimental Example 15 | 150 | 85.0 | 1.5 | 0.0 |
| Experimental Example 16 | 150 | 85.0 | 1.5 | 0.0 |
| Experimental Example 17 | 150 | 85.0 | 0.0 | 0.0 |

| | Carboxylate group (wt %) | Hydroxyl group (wt %) | Epoxy group (wt %) |
|---|---|---|---|
| Experimental Example 9 | 0.0 | 0.4 | 2.0 |
| Experimental Example 10 | 0.0 | 0.4 | 2.0 |
| Experimental Example 11 | 0.0 | 0.4 | 2.0 |
| Experimental Example 12 | 0.0 | 0.4 | 2.0 |
| Experimental Example 13 | 0.0 | 0.4 | 2.0 |
| Experimental Example 14 | 0.0 | 0.4 | 2.0 |

TABLE 2-continued

| Experimental Example 15 | 0.0 | 0.0 | 2.0 |
|---|---|---|---|
| Experimental Example 16 | 0.0 | 0.4 | 0.0 |
| Experimental Example 17 | 1.5 | 0.4 | 2.0 |

Next, the thus-prepared mixture is charged into a sand mill together with a polyester-polyurethane resin containing a sulfonate group and having a molecular weight of 30,000, alumina and a mixed solvent composed of methyl ethyl ketone, cyclohexanone and toluene at a weight ratio of 1:1:1, and then diluted and dispersed for 5 hours to form a raw coating material. The polyester-polyurethane resin was charged in such an amount that the total content of the binder was 20 parts by weight, based on 100 parts by weight of the mixture. The alumina was added in an amount of 3 parts by weight based on 100 parts by weight of the mixture. The solvent was charged in such an amount that the solid content of the mixture was 35% by weight.

The raw coating material prepared via the aforementioned mixing and dispersing step was filtered and then mixed with 4 parts by weight of polyisocyanate (COLONATE L manufactured by Nippon Polyurethane Industry Co., Ltd.) and 1 part by weight of myristic acid and 1 part by weight of butyl stearate both as a lubricant, based on 100 parts by weight of the magnetic powder. The mixture was agitated for 10 minutes to prepare a magnetic coating material.

The thus-prepared magnetic coating material was coated on a base film made of polyethylene terephthalate and having 10 μm thickness such that a magnetic layer having a thickness of 2 μm upon drying was formed. The magnetic layer was subjected to a magnetic field orientation while the layer remained in undried state, and then dried. The resultant film was wound into a roll and in turn subjected to a calendar treatment and hardening treatment. Thereafter, a back coat layer having a thickness of 0.5 μm was formed on a back surface of the base film opposite to a side where the magnetic layer is formed. The thus-obtained raw magnetic film was cut into strips each having a width of 8 mm to prepare a magnetic tape.

The magnetic tape prepared above was examined for magnetostatic properties, electromagnetic conversion properties and travel durability.

In the meantime, the magnetostatic properties (remanence ratio) of the magnetic tape was measured by a sample-oscillating type magnetometer manufactured by Toei Kogyo Co., Ltd.

The electromagnetic conversion properties of the magnetic tape was evaluated in the following manner. That is, the magnetic tape was loaded on a drive apparatus EXB-8505XL for data 8-mm tape manufactured by EXABYTE Corp. and traveled along a magnetic head, upon which a 8.5 MHz output level from the magnetic head was measured.

In addition, the travel durability of the magnetic tape was evaluated in the following manner. That is, the magnetic tape was loaded on the drive apparatus for data 8-mm tape and traveled along a magnetic head 1,000 times, upon which reduction in the output was measured.

The results are shown in Tables 3 and 4.

TABLE 3

| | Remanence ratio (%) | RF output (dB) | Travel Durability (dB) | Remarks |
|---|---|---|---|---|
| Experimental Example 1 | 85.0 | 3.0 | −1.0 | — |
| Experimental Example 2 | 83.0 | 1.5 | −1.0 | — |
| Experimental Example 3 | 83.0 | 1.5 | −1.0 | — |
| Experimental Example 4 | 80.0 | 0.0 | −1.0 | — |
| Experimental Example 5 | 80.0 | 0.0 | −1.0 | — |
| Experimental Example 6 | 78.0 | −2.0 | −2.0 | — |
| Experimental Example 7 | 82.0 | 0.0 | −4.0 | dust formed |
| Experimental Example 8 | 82.0 | 1.0 | −2.0 | dehydrochlorination occurred after burning |

TABLE 4

| | Remanence ratio (%) | RF output (dB) | Travel Durability (dB) | Remarks |
|---|---|---|---|---|
| Experimental Example 9 | 85.0 | 3.0 | −1.0 | — |
| Experimental Example 10 | 83.0 | 1.5 | −1.0 | — |
| Experimental Example 11 | 83.0 | 1.5 | −1.0 | — |
| Experimental Example 12 | 80.0 | 0.0 | −1.0 | — |
| Experimental Example 13 | 80.0 | 0.0 | −1.0 | — |
| Experimental Example 14 | 78.0 | −2.0 | −2.0 | — |
| Experimental Example 15 | 82.0 | 0.0 | −4.0 | dust formed |
| Experimental Example 16 | 82.0 | 1.0 | −2.0 | dehydrochlorination occurred after burning |
| Experimental Example 17 | 81.0 | −0.5 | −4.0 | — |

As is appreciated from Tables 3 and 4, the magnetic tapes prepared in Experimental Examples 1 to 3 and 9 to 11 in which the vinyl chloride-based copolymer containing a sulfonate group and/or a group derived from quaternary ammonium salt, a hydroxyl group and an epoxy group and having an average degree of polymerization of 100 to 200 was used in the mixing and kneading step, all exhibited excellent electromagnetic conversion properties and travel durability.

On the other hand, the magnetic tapes prepared in Experimental Examples 4 to 5 and 12 to 13 in which the vinyl chloride-based copolymer having an average degree of polymerization out of the afore-mentioned range was used in the mixing and kneading step, and the magnetic tapes prepared in Experimental Examples 6 to 7 and 14 to 15 in which the vinyl chloride-based copolymer without any one of the sulfonate group, the group derived from quaternary ammonium salt and the hydroxyl group was used in the mixing and kneading step, showed a low dispersibility of the magnetic powder in the binder and a low mechanical strength of the magnetic layer so that the electromagnetic conversion properties and the travel durability of the resultant magnetic recording medium were deteriorated. Further, the magnetic tapes prepared in Experimental Examples 8 and 16 in which the vinyl chloride-based copolymer having no epoxy group exhibited electromagnetic conversion properties and travel durability enough to bear a practical use as far as the copolymer contained any one of the sulfonate group, the group derived from quaternary ammonium salt and the hydroxyl group. However, when such a vinyl chloride-based copolymer was burned, a hydrochloric acid gas was generated. The hydrochloric acid gas was derived from the vinyl chloride-based copolymer and likely to cause corrosion of the magnetic film layer due to the dehydrochlorination of the vinyl chloride-based copolymer. Furthermore, the magnetic tape prepared in Experimental Example 17 in which the vinyl chloride-based copolymer containing not only the hydroxyl group and epoxy group but also a carboxylic group as a hydrophilic group was used, could not exhibit sufficient electromagnetic conversion properties and travel durability.

As a result, it was confirmed that a suitable binder used in the mixing and kneading step was the vinyl chloride-based copolymer containing a sulfonate group and/or a group derived from quaternary ammonium salt, a hydroxyl group and an epoxy group and having an average degree of polymerization of 100 to 200.

Experimental Examples 18 to 39

Studies on Composition Ratio of Mixture Treated in Mixing and Kneading Step

The procedures of Experimental Example 1 or 9 were repeated in the same manner except that the solid content of the mixture treated in the mixing and kneading step and the weight ratio of the magnetic powder to the binder were changed as shown in Tables 5 and 6, so that magnetic tapes of Experimental Examples 18 to 39 were obtained. Specifically, in Experimental Examples 18 to 28, the vinyl chloride-based copolymer into which the sulfonic group as a hydrophilic group was introduced was used as a binder for the mixing and kneading step similarly to Experimental Example 1 while, in Experimental Examples 29 to 39, the vinyl chloride-based copolymer into which the group derived from quaternary ammonium salt as a hydrophilic group was introduced was used as a binder for the mixing and kneading step similarly to Experimental Example 9. Further, in Experimental Examples 27 and 38, the alumina was added to the coating material not in the later diluting and dispersing step but in the earlier mixing and kneading step. The amount of the alumina added in the mixing and kneading step was 3 parts by weight. Furthermore, in Experimental Examples 28 and 39, 3 parts by weight of carbon was added to a mixture composed of the magnetic powder, the binder and the solvent in the mixing and kneading step.

TABLE 5

| | Amount of carbon added (part by weight) | Amount of alumina added (part by weight) | Solid content of mixture in mixing and kneading step (%) | Weight ratio of magnetic powder to binder |
|---|---|---|---|---|
| Experimental Example 18 | 0.0 | 0.0 | 90.0 | 10.0 |

TABLE 5-continued

| | Amount of carbon added (part by weight) | Amount of alumina added (part by weight) | Solid content of mixture in mixing and kneading step (%) | Weight ratio of magnetic powder to binder |
|---|---|---|---|---|
| Experimental Example 19 | 0.0 | 0.0 | 80.0 | 10.0 |
| Experimental Example 20 | 0.0 | 0.0 | 85.0 | 15.0 |
| Experimental Example 21 | 0.0 | 0.0 | 85.0 | 6.0 |
| Experimental Example 22 | 0.0 | 0.0 | 75.0 | 10.0 |
| Experimental Example 23 | 0.0 | 0.0 | 95.0 | 10.0 |
| Experimental Example 24 | 0.0 | 0.0 | 70.0 | 10.0 |
| Experimental Example 25 | 0.0 | 0.0 | 85.0 | 20.0 |
| Experimental Example 26 | 0.0 | 0.0 | 85.0 | 5.0 |
| Experimental Example 27 | 0.0 | 3.0 | 85.0 | 10.0 |
| Experimental Example 28 | 3.0 | 0.0 | 85.0 | 10.0 |

TABLE 6

| | Amount of carbon added (part by weight) | Amount of alumina added (part by weight) | Solid content of mixture in mixing and kneading step (%) | Weight ratio of magnetic powder to binder |
|---|---|---|---|---|
| Experimental Example 29 | 0.0 | 0.0 | 90.0 | 10.0 |
| Experimental Example 30 | 0.0 | 0.0 | 80.0 | 10.0 |
| Experimental Example 31 | 0.0 | 0.0 | 85.0 | 15.0 |
| Experimental Example 32 | 0.0 | 0.0 | 85.0 | 6.0 |
| Experimental Example 33 | 0.0 | 0.0 | 75.0 | 10.0 |
| Experimental Example 34 | 0.0 | 0.0 | 95.0 | 10.0 |
| Experimental Example 35 | 0.0 | 0.0 | 70.0 | 10.0 |
| Experimental Example 36 | 0.0 | 0.0 | 85.0 | 20.0 |
| Experimental Example 37 | 0.0 | 0.0 | 85.0 | 5.0 |
| Experimental Example 38 | 0.0 | 3.0 | 85.0 | 10.0 |
| Experimental Example 39 | 3.0 | 0.0 | 85.0 | 10.0 |

The thus-prepared magnetic tapes were evaluated with respect to magnetostatic properties, electromagnetic conversion properties and travel durability. The results are shown in Tables 7 and 8.

TABLE 7

| | Remanence ratio (%) | RF output (dB) | Travel Durability (dB) | Remarks |
|---|---|---|---|---|
| Experimental Example 18 | 82.0 | 2.0 | -1.0 | — |
| Experimental Example 19 | 85.0 | 1.0 | -1.0 | — |
| Experimental Example 20 | 82.0 | 2.0 | -1.5 | — |
| Experimental Example 21 | 85.0 | 1.0 | -1.0 | — |
| Experimental Example 22 | 84.0 | +0.5 | | — |
| Experimental Example 23 | — | — | — | Mixing disabled due to high load |
| Experimental Example 24 | 82.0 | -0.5 | -1.0 | — |
| Experimental Example 25 | — | — | — | Mixing disabled due to high load |
| Experimental Example 26 | 84.0 | 0.0 | -1.0 | — |
| Experimental Example 27 | 80.0 | -1.0 | -1.0 | — |
| Experimental Example 28 | 81.0 | -0.5 | -1.0 | — |

TABLE 8

| | Remanence ratio (%) | RF output (dB) | Travel Durability (dB) | Remarks |
|---|---|---|---|---|
| Experimental Example 29 | 82.0 | 2.0 | -1.0 | — |
| Experimental Example 30 | 85.0 | 1.0 | -1.0 | — |
| Experimental Example 31 | 82.0 | 2.0 | -1.0 | — |
| Experimental Example 32 | 85.0 | 1.0 | -1.0 | — |
| Experimental Example 33 | 84.0 | +0.5 | -1.0 | — |
| Experimental Example 34 | — | — | — | Mixing disabled due to high load |
| Experimental Example 35 | 81.0 | -0.5 | -1.0 | — |
| Experimental Example 36 | — | — | — | Mixing disabled due to high load |
| Experimental Example 37 | 84.0 | 0.0 | -1.0 | — |
| Experimental Example 38 | 80.0 | -1.0 | -1.0 | — |
| Experimental Example 39 | 81.0 | -0.5 | -1.0 | — |

As is appreciated from Tables 7 and 8, in Experimental Examples 18 to 22 and 29 to 33 in which any carbon or alumina was not added, the solid content of the mixture treated in the mixing and kneading step was adjusted to 75 to 90% by weight and the weight ratio of the magnetic powder to the binder was adjusted to a value ranging from 6 to 15, all of the magnetic tapes prepared could exhibit excellent electromagnetic conversion properties and travel durability.

On the other hand, in Experimental Examples 23 and 34 in which the solid content of the mixture treated in the mixing and kneading step was larger than the afore-mentioned range according to the present invention, and in Experimental Examples 25 and 36 in which the weight ratio of the magnetic powder to the binder was larger than the afore-mentioned range according to the present invention, it is impossible to mix or knead the raw materials in the mixing and kneading step because a load exerted on the kneader by the raw materials became too large. Further, in Experimental Examples 24 and 35 in which the solid content of the mixture treated in the mixing and kneading step was smaller than that the given range, in Experimental Examples 26 and 37 in which the weight ratio of the magnetic powder to the binder was smaller than the given range, and in Experimental Examples 27 to 28 and 38 to 39 in which carbon or alumina was added in the mixing and kneading step, the magnetic tapes prepared was deteriorated in electromagnetic conversion properties because of low dispersibility of the magnetic powder in the binder.

As a result, it was suitable that the magnetic powder was added as a sole powder component, in the mixing and kneading step, the solid content of the mixture treated in the mixing and kneading step was adjusted to 75 to 90% by weight and the weight ratio of the magnetic powder was adjusted to the binder to 6 to 15.

Experimental Examples 40 to 45

Studies on Binder Treated in Diluting and Dispersing Step

The procedures of Experimental Example 1 or 9 were repeated in the same manner except that the binder used in the diluting and dispersing step was changed as shown in Tables 9 and 10 so that magnetic tapes of Experimental Examples 40 to 45 were obtained. Specifically, in Experimental Examples 40 to 42, the vinyl chloride-based copolymer into which the sulfonate group as a hydrophilic group was introduced, was used as a binder treated in the mixing and kneading step similarly to Experimental Example 1. Whereas, in Experimental Examples 43 to 45, the vinyl chloride-based copolymer into which the group derived from quaternary ammonium salt was introduced, was used as a binder treated in the mixing and kneading step.

TABLE 9

| | Binder used in diluting and dispersing step |
|---|---|
| Experimental Example 40 | vinyl chloride-based copolymer (degree of polymerization: 150, content: vinyl chloride; 15% by weight, sulfonate group; 0.4% by weight, epoxy group; 2.0% by weight) |
| Experimental Example 41 | vinyl chloride-based copolymer containing sulfonate group (degree of polymerization: 300) |
| Experimental Example 42 | butyral (degree of polymerization: 300) |

TABLE 10

| | Binder used in diluting and dispersing step |
|---|---|
| Experimental Example 43 | vinyl chloride-based copolymer (degree of polymerization: 150, content: vinyl chloride; 15% by weight, sulfonate group; 0.4% by weight, epoxy group; 2.0% by weight) |
| Experimental Example 44 | vinyl chloride-based copolymer containing sulfonate group (degree of polymerization: 300) |
| Experimental Example 45 | butyral (degree of polymerization: 300) |

The thus-prepared magnetic tapes were evaluated with respect to magnetostatic properties, electromagnetic conversion properties and travel durability. The results are shown in Tables 11 and 12.

TABLE 11

| | Remanence ratio (%) | RF output (dB) | Travel Durability (dB) | Remarks |
|---|---|---|---|---|
| Experimental Example 40 | 84.0 | 2.5 | −1.5 | — |
| Experimental Example 41 | 83.0 | 2.0 | −1.0 | — |
| Experimental Example 42 | 82.0 | 1.5 | −1.0 | — |

TABLE 12

| | Remanence ratio (%) | RF output (dB) | Travel Durability (dB) | Remarks |
|---|---|---|---|---|
| Experimental Example 43 | 84.0 | 2.5 | −1.5 | — |
| Experimental Example 44 | 83.0 | 2.0 | −2.0 | — |
| Experimental Example 45 | 82.0 | 1.5 | −1.0 | — |

As is appreciated from Tables 11 and 12, it was confirmed that the magnetic tapes prepared in Experimental Examples 40 to 45 all exhibited excellent electromagnetic conversion properties and travel durability.

As a result, it was ascertained that, if the conditions for the mixing and kneading step were adjusted properly, it was not required that the kind of the binder used in the diluting and dispersing step was limited to particular ones, and therefore any conventional binder could be used therein.

As is apparent from the above description, in accordance with the present invention, when the vinyl chloride-based copolymer containing a sulfonate group and/or a group derived from quaternary ammonium salt, a hydroxyl group and an epoxy group and having an average degree of polymerization of 100 to 200, is used as a binder treated in the mixing and kneading step in which the magnetic powder having a major axis length of 0.1 μm or less was mixed or kneaded with the binder and the solvent, and when the composition of the mixture in the mixing and kneading step can be regulated properly, there can be produced a magnetic recording medium capable of exhibiting excellent electromagnetic conversion properties and travel durability even in a high density recording region.

What is claimed is:

1. A method for making a magnetic coating composition, comprising the steps of:

intimately admixing and kneading a mixture of a finely divided magnetic powder having a major axis length of 0.1 μm or less as the sole powder component, a vinyl-chloride copolymer-based first binder resin having an average degree of polymerization of from about 100 to about 200 and containing from about 0.3 to about 3.0% by weight of quaternary ammonium salt groups, from about 0.1 to about 1.5% by weight hydroxyl groups and from about 1.0 to about 10% by weight of epoxy groups, based upon the weight of said copolymer, and a solvent, the weight ratio of said magnetic powder to said first binder resin being from about 6 to 15:1, said mixture having a solids content of from about 75 to about 95% by weight, until a substantially uniform first dispersion is obtained;

admixing said first dispersion with a mixture of a non-magnetic hard inorganic powder, a second resin binder and a solvent until a second relatively dilute dispersion is obtained; and thereafter, admixing from about 0.05 to about 0.5 parts by weight, based on 100 parts by weight of said first binder resin, of a cross linking compound into said second dispersion to form said magnetic coating composition.

2. A method as defined in claim 1, wherein a plasticizer or a lubricant or both are added in said second admixing step in forming said second dispersion.

3. A method as defined in claim 1, wherein in said third admixing step, at least one lubricant is added with the cross linking compound.

4. A method for making a magnetic recording medium, comprising the steps of:

preparing a magnetic coating composition in accordance with the method of claim 4;

providing a substrate having a pair of opposed surfaces;

applying the magnetic coating composition on a first surface of the substrate to provide a magnetic layer on the substrate in an undried state;

subjecting the undried magnetic layer to magnetic field orientation; and thereafter, drying the magnetic layer to provide the magnetic recording medium.

5. A method as defined in claim 4, further comprising the step of calendaring the magnetic recording medium.

6. A method as defined in claim 4, further comprising the step of applying a back coat layer on the second surface of the substrate opposite the magnetic recording layer.

7. A method as defined in claim 4, further comprising the step of applying a top coat layer containing a rest-preventive or a lubricant on said magnetic recording layer.

* * * * *